US010303775B2

(12) United States Patent
Hwang et al.

(10) Patent No.: US 10,303,775 B2
(45) Date of Patent: May 28, 2019

(54) STATISTICAL MACHINE TRANSLATION METHOD USING DEPENDENCY FOREST

(71) Applicant: Eleven Street Co., Ltd., Seoul (KR)

(72) Inventors: Young Sook Hwang, Seoul (KR); Sang-Bum Kim, Seoul (KR); Shouxun Lin, Beijing (CN); Zhaopeng Tu, Beijing (CN); Yang Liu, Beijing (CN); Qun Liu, Beijing (CN); Chang Hao Yin, Seoul (KR)

(73) Assignee: ELEVEN STREET CO., LTD., Seoul (KR)

( * ) Notice: Subject to any disclaimer, the term of this patent is extended or adjusted under 35 U.S.C. 154(b) by 0 days.

(21) Appl. No.: 15/968,078

(22) Filed: May 1, 2018

(65) Prior Publication Data

US 2018/0314690 A1 Nov. 1, 2018

Related U.S. Application Data

(63) Continuation of application No. 13/818,137, filed as application No. PCT/KR2011/003968 on May 31, 2011, now abandoned.

(30) Foreign Application Priority Data

Aug. 23, 2010 (KR) ........................ 10-2010-0081378

(51) Int. Cl.
*G06F 17/28* (2006.01)
*G06F 17/27* (2006.01)

(52) U.S. Cl.
CPC ........ *G06F 17/2872* (2013.01); *G06F 17/271* (2013.01); *G06F 17/2818* (2013.01)

(58) Field of Classification Search
CPC combination set(s) only.
See application file for complete search history.

(56) References Cited

U.S. PATENT DOCUMENTS 8,285,536 B1 * 10/2012 Kumar ................ G06F 17/2809
704/2
8,401,836 B1 * 3/2013 Kumar ................ G06F 17/2809
704/2
2009/0240487 A1 9/2009 Shen et al.

OTHER PUBLICATIONS

Haitao, Mi et al., "Forest-based Translation Rule Extraction", Proceeding of EMNLP 2008, pp. 206-214, Oct. 27, 2008.
Haitao, Mi et al., "Constituency to Dependency Translation with Forests". Proceedings of ACL 2010, pp. 1433-1442, Jul. 11-16, 2010.
Yang, Liu et al., "Improving Tree-to-Tree Translation with Packed Forest", Proceeding of ACL/IJCNLP 2009, pp. 558-566, Aug. 2-7, 2009.
International Search Report dated Feb. 24, 2012 for corresponding Application No. PCT/KR2011/003968.

* cited by examiner

*Primary Examiner* — Barbara D Reinier
(74) *Attorney, Agent, or Firm* — Brinks Gilson & Lione

(57) ABSTRACT

The present invention relates to the use of a plurality of dependency trees in tree-based statistical machine translation and proposes a dependency forest to effectively process the plurality of dependency trees. The present invention can improve a translation capability by generating a translation rule and a dependency language model by using the dependency forest and applying the generated translation rule and dependency language model when a source language text is converted to a target language text.

12 Claims, 4 Drawing Sheets

STATISTICAL MACHINE TRANSLATION METHOD USING DEPENDENCY FOREST

CROSS-REFERENCE TO RELATED APPLICATION

This application is a continuation application of non-provisional U.S. patent application Ser. No. 13/818,137, filed on Feb. 21, 2013, which is the National Phase application of International Application No. PCT/KR2011/003968, filed on May 31, 2011, which designates the United States and claims priority to Korean Patent Application No. 10-2010-0081378, filed on Aug. 23, 2010. The entirety of all of related applications are hereby incorporated by reference.

TECHNICAL FIELD

The present invention relates to a statistical machine translation method using a dependency forest, and more particularly, to a statistical machine translation method using a dependency forest which can improve a translation capability by performing a dependency analysis for a corpus of a pair of languages to generate a plurality of dependency trees, combining the plurality of generated dependency trees to generate a dependency forest, using the dependency forest to generate a translation rule and a dependency language model, and then applying the generated translation rule and dependency language model when a source-language text is converted to a target-language text.

BACKGROUND ART

FIG. 1 shows a dependency tree of an English sentence "He saw a boy with a telescope". As shown in FIG. 1, arrows face parent from children. The parent is often referred to as a head of the children. For example, "saw" is the head of "he" in FIG. 1. Since the dependency tree does not need a phrase structure analysis of a sentence, the dependency tree has relatively low complexity in comparison with the phrase structure analysis. It was proposed a string-to-dependency translation model which converts a string to the dependency tree in 2008 by Shen et al. The string-to-dependency translation model which converts a source language string to the dependency tree of a target language has two important features. The first feature is that a string-to-dependency translation model rule should have a well-formed dependency structure in a target language side. The well-formed dependency structure enables an effective dynamic programming and retains many useful non-constituent rules. The well-formed dependency structure may include a fixed structure or a floating structure. In the fixed structure, all children form a complete dependency tree. The floating structure consists of sibling nodes having a common head, and the head itself is not specified or is floating. For example, FIGS. 2A and 2B show two fixed structures and FIG. 2C shows the floating structure.

FIG. 1 illustrates a training example including an English dependency tree, a Chinese translation and a word arrangement. An English sentence is given in order to conveniently identify a correspondence between an English word and a Chinese word. Extracting a string-dependency rule from a pair of aligned string-dependency is similar to extracting SCFG except that target language side is a well-formed structure. For example, it is possible to extract a string-dependency rule corresponding to a word alignment as follows.

With ((a) telescope)→dai wangyuanjing de

Further, it is possible to obtain a rule having one non-terminal symbol by replacing the smaller rule "(a) telescope→wangyuanjing" with the non-terminal symbol as follows:

with $(X_1)$→dai $X_1$ de

Here, "X" denotes a non-terminal symbol, and a subscript "1" denotes a correspondence between non-terminal symbols of source language and target language.

Shen et al introduced a dependency language model in 2008. Due to the dependency language model, a generation of target sentence is well-described because the dependency language model directly models a semantic structure of a sentence. Compared with an n-gram language model in the prior art, a language model reflecting the dependency excels at capturing a non-local dependency between words (for example, "saw" . . . "with" in FIG. 1). When the dependency tree is given, a dependency language model probability becomes the product of three sub models defined between a head word and its dependency word.

For example, a tree probability in FIG. 1 may be calculated as follows:

Probability=$P_T$(saw)

$\times P_L$(he|saw-as-head)

$\times P_R$(boy|saw-as-head)

$\times P_R$(with|boy,saw-as-head)

$\times P_L$(a|boy-as-head)

$\times P_R$(telescope|with-as-head)

$\times P_L$(a|telescope-as-head)

Here, $P_T(x)$ denotes a probability of a word x which is a root of the dependency tree. $P_L$ and $P_R$ denote generation probabilities of right and left sides, respectively.

A recent dependency parser has a high quality (English 91% and Chinese 87%), but the dependency parser is not sufficient for the statistical machine translation. Since a string-to-tree system is dependent on one best tree for parameter estimation, qualities of a rule table and a dependency language model are influenced by a parsing error, thereby a translation error occurs.

DISCLOSURE

Technical Problem

The present invention has been made to solve the above-mentioned problems and intends to improve qualities of a rule table and a dependency language model by using a new concept of a dependency forest generated by combining a plurality of dependency trees instead of one best dependency tree.

Also, the present invention intends to improve a translation capability by applying the rule table and the dependency language model generated using the dependency forest.

Technical Solution

In accordance with a first aspect of the present invention, a method of generating a translation rule includes extracting a translation rule by using a dependency forest generated by combining a plurality of dependency trees.

In accordance with a second aspect of the present invention, a method of generating a translation rule includes performing a dependency analysis for a bilingual corpus;

generating a dependency tree by the dependency analysis and generating a dependency forest by combining a plurality of dependency trees; searching for a plurality of well-formed structures for each node within the dependency forest; and extracting a translation rule when dependency structures within the plurality of well-formed structures correspond to a word alignment.

In accordance with a third aspect of the present invention, a statistical machine translation method includes translating a source language by using a translation rule and a dependency language model generated from a dependency forest generated by combining a plurality of dependency trees.

In accordance with a fourth aspect of the present invention, an apparatus for generating a translation rule includes a means that generates a dependency tree by performing a dependency analysis for a corpus of a pair of languages and generates a dependency forest by combining a plurality of dependency trees; a means that searches for a plurality of well-formed structures for each node within the dependency forest; and a means that extracts a translation rule when dependency structures within the plurality of well-formed structures correspond to a word alignment.

In accordance with a fifth aspect of the present invention, a statistical machine translation apparatus includes a dependency parser that generates a dependency tree by performing a dependency analysis for a source sentence and a target sentence of a corpus of a pair of languages and generates a dependency forest for the source sentence and the target sentence by combining a plurality of dependency trees; a translation rule extractor that extracts a translation rule by using the dependency forest; a language model trainer that generates a dependency language model by using the dependency forest of the target sentence; and a decoder that converts a source sentence text to a target sentence text by applying the translation rule and the dependency language model.

Advantageous Effects

Accordingly, the present invention has an effect of greatly improving a capability of string-dependency translation in comparison with a translation method using one best dependency tree by generating a rule table and a dependency language model from a dependency forest generated by combining a plurality of dependency trees and performing translation using the rule table and the dependency language model.

BEST MODE

Figure 1:
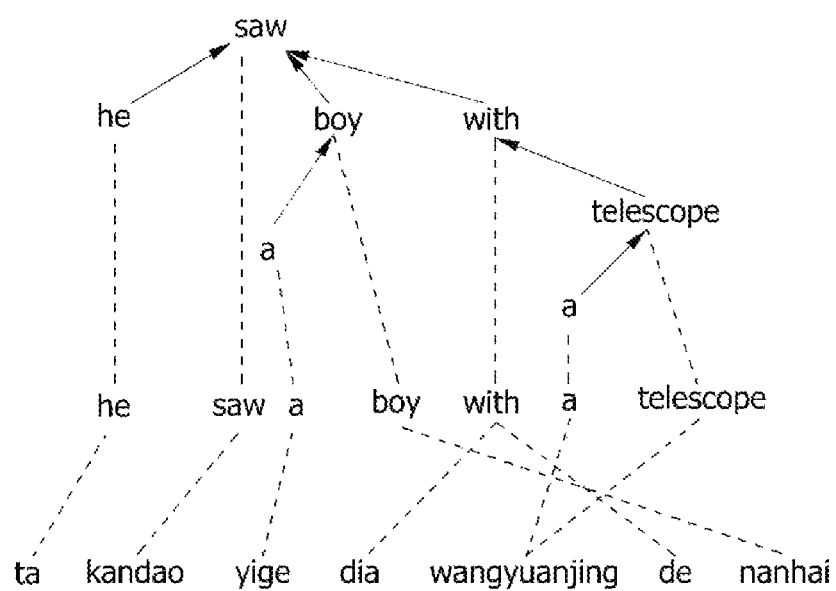
FIG. 1 illustrates a training example including a dependency tree of an English sentence, a Chinese translation, and a word arrangement.

Hereinafter, exemplary embodiments of the present invention will be described in detail with reference to the accompanying drawings. A configuration of the present invention and an operational effect thereof will be clearly understood through the following detailed description.

Prior to the detailed description of the present invention, it should be noted that the same components refer to the same reference numerals anywhere as possible in the drawings and the detailed description will be omitted when known configurations may make the subject matter of the present invention unnecessarily ambiguous.

The present invention uses a source sentence string and a plurality of dependency trees for a corresponding target sentence during a training step in a tree-based statistical machine translation framework. The present invention suggests a dependency tree of a compact representation which is called a dependency forest in order to effectively process a plurality of dependency trees. The dependency forest has a hypergraph structure like a packed forest. The hypergraph-based dependency forest is arranged in a source sentence string. A plurality of translation rules are extracted by checking whether a target phrase is a well-formed structure from string-to-forest aligned corpus. Each node is a word in the dependency forest. A span is added to each node to distinguish the node. The nodes are connected by a hyperedge in the dependency forest. In the dependency tree, an edge faces from a dependant to a head of the dependant but the hyperedge packs all dependants having a common head.

A rule extraction algorithm searches for a well-formed structure for each node by a bottom-up method. The algorithm retains k-best well-formed structures for each node. A well-formed structure of the head may be configured from the dependants of the head.

In the dependency forest, k-best fixed and floating structures for each node may be obtained by manipulating a fixed structure of its own dependant. Then, when a dependency structure corresponds to a word arrangement, a string-dependency correspondence rule is extracted.

Dependency Forest

Figure 3:
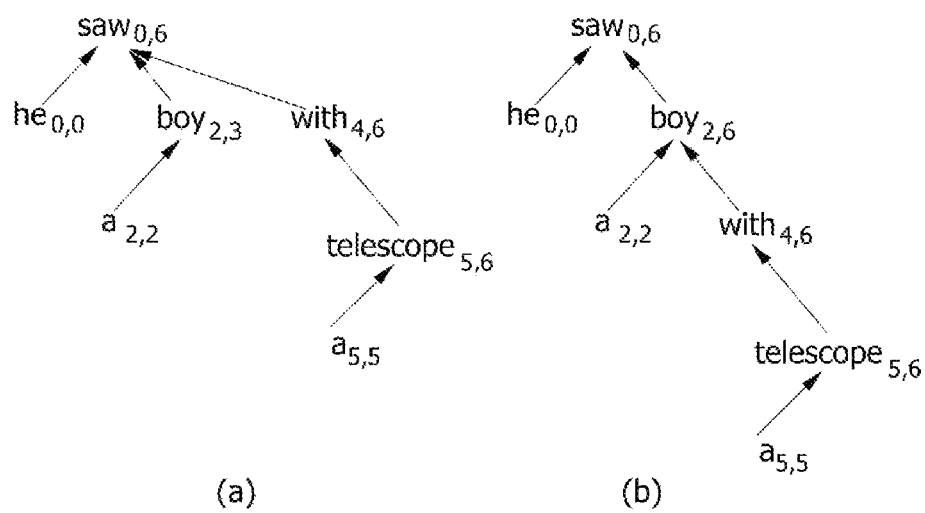
FIG. 3 illustrates two dependency trees in an English sentence.
Figure 4:
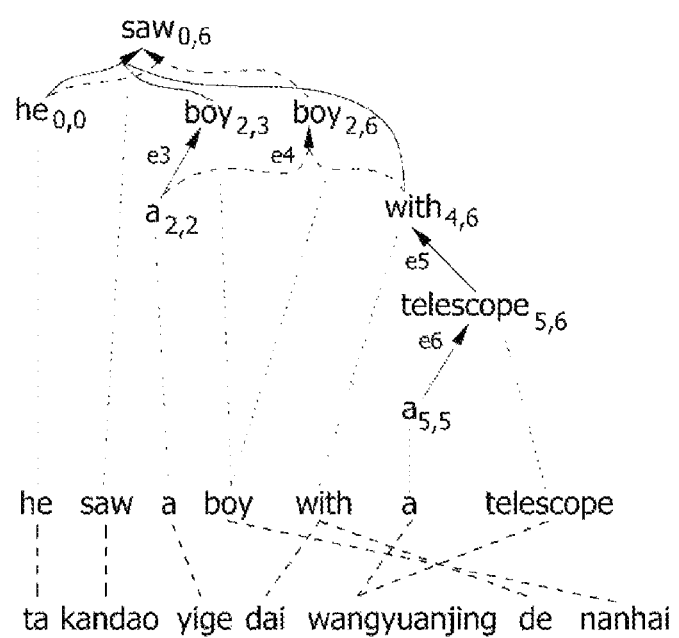
FIG. 4 illustrates a dependency forest where two dependency trees are densely shown.

FIGS. 3A and 3B illustrate two dependency trees for the example of the English sentence of FIG. 1. A prepositional phrase "with a telescope" may be dependent on "saw" or "boy". FIG. 4 illustrates a dependency forest where two dependency trees are densely shown by sharing common node and edge.

In the dependency forest, each node is a word. In order to distinguish between nodes, a span is added to each node. For example, a span of "a" is (2, 2). It is because "a" is a third word in the sentence. Since a fourth word "boy" dominates a node $a_{2,2}$, the fourth word "boy" may be represented by $boy_{2,3}$. Here, it should be noted that a position of "boy" is considered. Similarly, a word "boy" in FIG. 3B may be represented by $boy_{2,6}$. In the dependency forest, nodes are connected by the hyperedge. In the dependency tree, the edge only faces from a dependant to a head of the dependant, but the hyperedge packs all dependants having a common head.

For example, a hyperedge e1 in FIG. 4 indicates that $he_{0,0}$, $boy_{2,3}$, and $with_{4,6}$ are dependants of $saw_{0,6}$ from a left side to a right side.

$e1: <(he_{0,0}, boy_{2,3}, with_{4,6}), saw_{0,6}>$

The dependency forest may be formally represented by a $<V, E>$ pair. Here, V denotes a node set, and E denotes a hyperedge set. Each node belongs to V ($v \in V$), and is represented in a form of $w_{i,j}$. in a sentence w0:n−1=w0 . . . wn−1 consisting of n words. The $w_{i,j}$ indicates that a node corresponding to the $w_{i,j}$ dominates a substring from a position of i to a position of j except for itself. Each hyperedge belongs to E ($e \in E$), and is represented by a <tail(e), head(e)> pair. A head(e) belongs to V as a head (head(e)∈V), and tail(e) also belongs to V as a dependant of the head (tail(e)∈V).

The dependency forest has a hypergraph structure like a packed forest. However, the packed forest handles a PCFG rule probability corresponding to each hyperedge as a weight, while the dependency forest has a hypergraph to which the weight is applied. It is because a dependency parser outputs a positive or a negative score for each edge of the dependency tree rather than the hyperedge of the dependency forest. For example, in FIG. 3A, scores for edges he→saw, boy→saw, and with→saw are 13, 22, and −12, respectively.

In order to allocate a probability to each hyperedge, the positive number for the hyperedge may be first obtained using a score of a corresponding edge.

$$c(e) = \exp\left(\frac{\sum_{v \in tails(e)} s(v, head(e))}{|tails(e)|}\right)$$

Here, C(e) denotes a count of a hyperedge e, head(e) denotes a head, tail(e) denotes a dependant set of the head, v denotes one dependant, and s(v, head(e)) denotes a score of an edge to head(e) in v. For example, in FIG. 4, a count of a hyperedge e1 is as follows.

$$c(e_1) = \exp\left(\frac{13 + 22 - 12}{3}\right)$$

Further, a probability p(e) of the hyperedge may be obtained by normalizing counts between all hyperedges having the same head, which are collected from a training corpus.

$$p(e) = \frac{c(e)}{\sum_{e':head(e')=head(e)} c(e')}$$

As a result, it is possible to obtain a weighted dependency forest where each hyperedge has a probability.

Forest-based Rule Extraction

In tree-based rule extraction, all phrases of a pair of languages (or bilingual phrases) corresponding to a word arrangement are first listed, and then it is checked whether a dependency structure for a target phrase is a well-formed structure. However, since the well-formed structure for the target phrase exponentially increases in this algorithm, the algorithm does not operate in a forest scenario.

A GHKM algorithm, which is recently developed to extract a tree-to-string rule from a one-best tree, has been successfully and extendedly applied to the packed forest (Mi and Huang 2008). This algorithm distinguishes a rule of a minimum unit and a complex rule. Although there is the exponential number of complex rules, the number of minimum rules extracted from each node is somewhat limited. Accordingly, it is possible to obtain a good complex rule by combining minimum rules.

However, the GHKM algorithm cannot be applied to extract a string dependency rule from the dependency forest. It is because although this algorithm requires that a complete sub tree exists within the rule, any of the fixed or floating dependency structure does not guarantee to include all dependants of the head. For example, a floating structure of FIG. 2C actually includes two trees.

Figure 2:
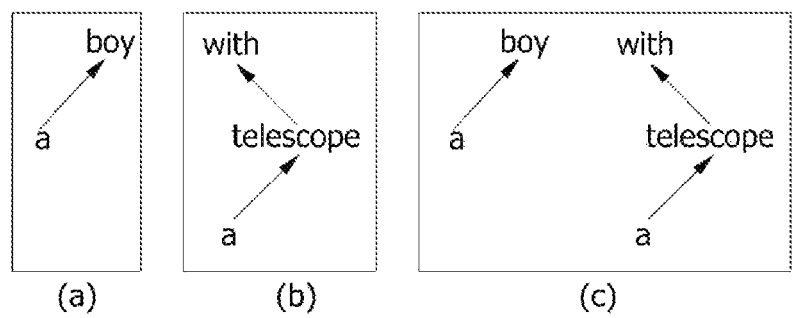
FIG. 2 illustrates a fixed structure and a floating structure in a well-formed dependency structure.

With respect to the above, the algorithm according to the present invention searches for a well-formed structure for each node through a bottom-up method. This algorithm retains k-best well-formed structures for each node, and the well-formed structure of the head may be configured by the well-formed structure of the dependant of the head. For example, since the fixed structure where telescope$_{5,6}$ is a root is (a) telescope in FIG. 4, the fixed structure where a node with$_{4,6}$ is a root may be obtained by adding the fixed structure of the dependant of the node with$_{4,6}$ to the node. FIG. 2B illustrates a structure according to the result.

Similarly, the floating structure of a node saw$_{0,6}$ may be obtained by connecting fixed structures of dependants boy$_{2,3}$ and with$_{4,6}$ thereof. FIG. 2C illustrates a structure according to the result.

Accordingly, k fixed and floating structures having the highest probability for the node may be obtained by manipulating the fixed structure of the dependant in the dependency forest. Then, when the dependency structure corresponds to the word arrangement, the string dependency rule may be extracted.

A method of evaluating the well-formed structure extracted from the node will be described. According to a document of Mi and Huang 2008, a fractional count is allocated to each well-formed structure. When a tree fragment t is given, a posterior probability is calculated using an inside-outside algorithm.

$$\alpha\beta(t) = \alpha(\text{root}(t)) \times \prod_{e \in t} p(e) \times \prod_{v \in leaves(t)} \beta(v)$$

Here, root(t) denotes a root of the tree, e denotes an edge, leaves(t) denotes a leaf (component) set of the tree, α(•) denotes an outside probability, and β(•) denotes an inside probability.

For example, a sub tree where boy$_{2,6}$ is a root has a next posterior probability in FIG. 4.

$$\alpha(\text{boy}_{2,6}) \times p(e_4) \times p(e_5) \times p(e_6) \times \beta(\alpha_{2,2}) \times \beta(\alpha_{5,5})$$

Then, a fractional frequency of a sub tree t is as follows.

$$c(t) = \frac{\alpha\beta(t)}{\alpha\beta(TOP)}$$

Here, TOP denotes a root node of the forest.

When the well-formed structure is non-constituent, a fractional count is approximated using a fractional count of a minimum tree fragment including the well-formed structure. Finally, the fractional count of the well-formed structure may be used for calculating a relative frequency of a rule having the well-formed structure in the target language side.

$$\Phi(r \mid lhs(r)) = \frac{c(r)}{\sum_{r':lhs(r')=lhs(r)} c(r')}$$

$$\Phi(r \mid rhs(r)) = \frac{c(r)}{\sum_{r':rhs(r')=rhs(r)} c(r')}$$

Forest-based Dependency Language Model Trainings

In order to train a dependency language model from the dependency forest, all heads and dependants thereof should be collected. The collection may be easily performed by listing all hyperedges. Similarly, a posterior probability of each hyperedge e is calculated using the inside-outside algorithm.

$$\alpha\beta(e) = \alpha(\text{head}(e)) \times p(e) \times \prod_{v \in tails(e)} \beta(v)$$

For example, a posterior probability of a hyperedge $e_2$ in FIG. 4 is calculated as follows.

$$\alpha\beta(e_2) = \alpha(saw_{0,6}) \times p(e_2) \times \beta(he_{0,0}) \times \beta(boy_{2,6})$$

Then, a fractional frequency of the hyperedge e may be obtained.

$$c(e) = \frac{\alpha\beta(e)}{\alpha\beta(TOP)}$$

In each n-gram (for example, "boy-as-head a"), the same fractional frequency of the hyperedge including the n-gram itself is allocated.

Table 1 shows a BLEU score and an average decoding time for a Chinese-English test set.

TABLE 1

| Rule | DepLM | NIST2004 | NIST2005 | NIST2006 | time |
|---|---|---|---|---|---|
| tree | tree | 32.99 | 29.55 | 30.10 | 18.6 |
| tree | forest | 33.55* | 30.12* | 30.88* | 23.3 |
| forest | tree | 33.43* | 30.10* | 30.55* | 20.9 |
| forest | forest | 34.37** | 30.90** | 31.51** | 27.7 |

In Table 1, a first translation system (basic translation system) uses a dependency language model and a rule table trained from one-best dependency tree, and the remaining translation systems apply the dependency forest to at least one of the dependency language model and the rule table. * or ** means a better meaningful capability in comparison with the basic translation system.

First, an experiment is performed on a Chinese-English evaluation set. Table 1 shows the BLEU score on the test set. A first column "Rule" indicates whether the string dependency rule is trained from the one-best dependency tree or the dependency forest. Similarly, a second column "DepLM" also distinguishes two source languages for the training dependency language model.

The basic translation system uses the dependency language model and the rule table trained from the one-best dependency tree. In an exemplary embodiment of the present invention, the string dependency translation is consistently and meaningfully improved within a BLEU point range from +1.3 to +1.4 by adding the rule table and the dependency language model obtained from the dependency forest. Further, even though the rule table and the dependency language model trained from the dependency forest are used, a decoding time is slightly increased.

Table 2 shows a BLEU store for a Korea-Chinese test set. In order to inspect an efficiency of the present invention in respect to a pair of different languages, an experiment for Korean-Chinese translation is performed. A training corpus includes about 8.2 M Korean words and about 7.3 M Chinese words. A Chinese sentence is used for training a 5-gram dependency language model as well as a 3-gram dependency language model. Both development and test sets include 1,006 sentences having a single reference. Table 2 shows the BLEU score on the test set. Also, it can be seen that the forest-based method according to the present invention achieves significant improvements in comparison with the basic translation.

TABLE 2

| Rule | DepLM | NIST2004 |
|---|---|---|
| tree | tree | 32.99 |
| tree | forest | 33.55* |
| forest | tree | 33.43* |
| forest | forest | 34.37** |

Figure 5:
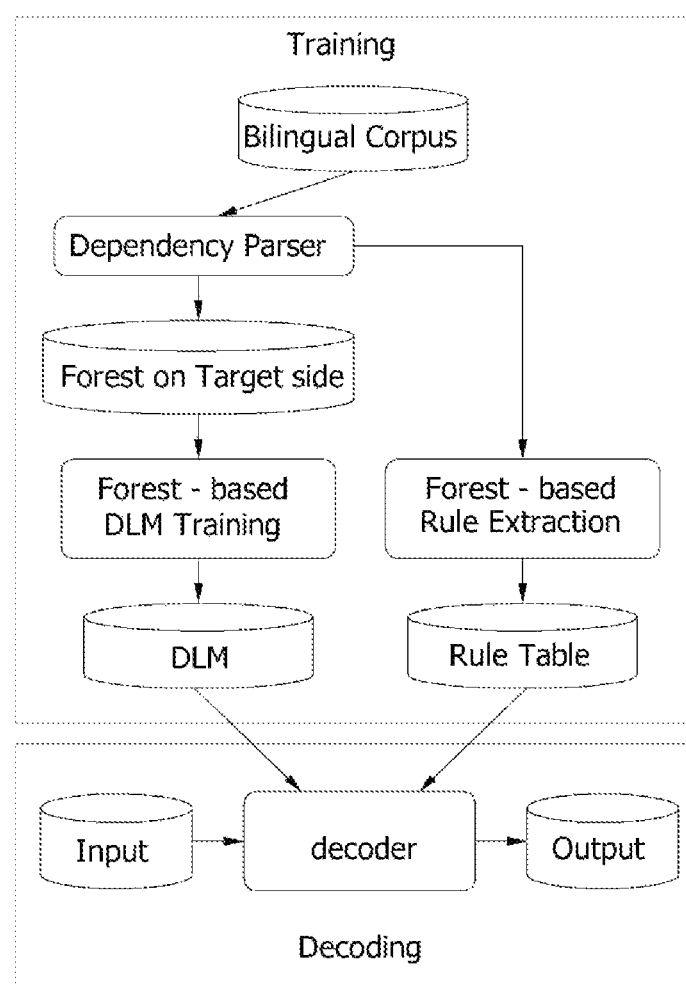
FIG. 5 illustrates a statistical machine translation apparatus according to the present invention.

FIG. 5 illustrates an internal configuration of a statistical machine translation apparatus according to an exemplary embodiment of the present invention. The statistical machine translation apparatus largely includes a training part and a decoding part.

In a brief description of an operation of the training part, a dependency parser first performs a phrase parsing for a source sentence and a target sentence of a bilingual corpus. According to a dependency analysis, a dependency tree for the source sentence and the target sentence is generated. The dependency parser generates a dependency forest for each of the source sentence and the target sentence by combining a plurality of generated dependency trees.

A translation rule extractor generates a translation rule by using the dependency forest, and stores the generated translation rule in a translation rule table. Further, a dependency language model trainer generates a dependency language model by using the dependency forest for the target sentence, and stores the generated dependency language model in a language model database (DLM).

In a brief description of an operation of the decoding part, a source language text (or input) is input to a decoder, and the decoder generates a target language text (or output) by using the translation rule and the dependency language model. The decoder can improve the translation capability by using the translation rule and the dependency language model generated from the dependency forest.

Meanwhile, the present invention can implement translation rule generation using the dependency forest and a machine translation method using the translation rule in a software program and apply the program to various reproduction apparatuses by recording the program in a predetermined computer-readable recording medium. The various reproduction apparatuses may be a PC, a notebook, a portable terminal and the like.

For example, the recording medium may be a hard disk, a flash memory, a RAM, a ROM and the like which are internal devices of each reproduction apparatus, or an optical disk such as a CD-R or a CD-RW, a compact flash card, smart media, a memory stick, and a multimedia card which are external devices of each reproduction apparatus.

The exemplary embodiments described in this specification of the present invention do not limit the present invention. The scope of the present invention should be construed by the appended claims and all technologies within the equivalent scope to that of the present invention should be construed as being included in the scope of the present invention.

INDUSTRIAL APPLICABILITY

The present invention can be widely used in a statistical machine translation field since the present invention can improve a translation capability by analyzing a dependency from a bilingual corpus to generate a plurality of dependency trees, combining the plurality of generated dependency trees to generate a dependency forest, using the dependency forest to generate a translation rule and a dependency language model, and then applying the generated translation rule and dependency language model when a source language text is converted to a target language text.

What is claimed is:

1. A method of generating a translation rule where the method is performed by a translation apparatus comprising a dependency parser, a translation rule extractor, a language model trainer, a memory and a decoder, the method comprising:
performing, with the dependency parser, a dependency analysis for a bilingual corpus;
generating, with the dependency parser, a dependency tree based on the dependency analysis;
generating, with the dependency parser, a dependency forest for the bilingual corpus by combining a plurality of dependency trees, wherein the dependency forest is aligned with a source sentence string;
generating, with the dependency parser, the dependency forest by connecting nodes forming the plurality of dependency trees by a hyperedge, wherein respective nodes of the dependency forest are connected by the hyperedge and the hyperedge is configured to pack all dependents having a common head;
extracting, with the translation rule extractor, a translation rule based on the dependency forest;
collecting, with the language model trainer, all heads and dependents by listing all hyperedges of the dependency forest;
generating, with the language model trainer, a dependency language model based on the collected heads and dependents;
storing the translation rule into the memory;
reading, with the decoder, the stored translation rule from the memory;
receiving, with the decoder, a source language text; and
generating, with the decoder, a target language text from the source language text by applying the translation rule.

2. The method of claim 1, wherein the method further comprises:
searching for a plurality of well-formed structures for each node within the dependency forest; and
extracting the translation rule when dependency structures within the plurality of well-formed structures correspond to a word alignment.

3. The method of claim 2, wherein the method comprises:
obtaining the plurality of well-formed structures by manipulating a fixed structure of dependents of the node, wherein the plurality of well-formed structures have k-best fixed and floating structures.

4. The method of claim 1, wherein the nodes are distinguished by a span.

5. The method of claim 1, wherein extracting the translation rule is based on string-to-forest aligned corpus.

6. The method of claim 1, wherein the method comprises:
maintaining a plurality of best well-formed structures for each node by searching for a well-formed structure for the node.

7. The method of claim 6, wherein the method comprises:
obtaining the plurality of best well-formed structures by connecting fixed structures of dependents of the node.

8. The method of claim 1, wherein the method further comprises:
translating a source language by using the translation rule and the dependency language model.

9. An apparatus for generating a translation rule comprising:
a non-transitory computer-readable medium; and
instructions stored on the computer-readable medium, the instructions configured to, when executed by a processor, cause the processor to:
perform a dependency analysis for a corpus of a pair of languages;
generate a dependency tree based on the dependency analysis;
generate a dependency forest for the corpus of the pair of languages by combining a plurality of dependency trees, wherein the dependency forest is aligned with a source sentence string;
generate the dependency forest by connecting nodes forming the plurality of dependency trees by a hyperedge, wherein respective nodes of the dependency forest are connected by the hyperedge and the hyperedge is configured to pack all dependents having a common head;
collect all heads and dependents by listing all hyperedges of the dependency forest;
generate a dependency language model based on the collected heads and dependents;
search for a plurality of well-formed structures for each node within the dependency forest;
extract a translation rule when dependency structures within the plurality of well-formed structures correspond to a word alignment;
store the translation rule;
read the stored translation rule;
receive a source language text; and
generate a target language text from the source language text by applying the translation rule.

10. The apparatus of claim 9, wherein:
the plurality of well-formed structures is obtained by controlling a fixed structure of dependents of the node, wherein the plurality of well-formed structures have k-best fixed and floating structures.

11. A statistical machine translation apparatus comprising:
a dependency parser configured to:
generate a dependency tree by performing a dependency analysis for a source sentence and a target sentence of a corpus of a pair of languages;
generate a dependency forest for the source sentence and the target sentence by combining a plurality of dependency trees; and
generate the dependency forest by connecting nodes forming a plurality of dependency trees by a hyperedge, wherein the hyperedge packs all dependents having a common head;
a translation rule extractor configured to extract a translation rule by using the dependency forest;
a language model trainer configured to:
generate a dependency language model by using the dependency forest of the target sentence;
collect all heads and dependents by listing all hyperedges of the dependency forest; and
generate the dependency language model based on the collected heads and dependents; and
a decoder configured to convert a source sentence text to a target sentence text based on the extracted translation rule and the generated dependency language model.

12. The apparatus of claim 11, wherein the translation rule extractor is configured to search for a plurality of well-formed structures for each node within the dependency forest and to extract the translation rule when dependency structures within the plurality of well-formed structures correspond to a word alignment.

\* \* \* \* \*